(12) United States Patent
Church et al.

(10) Patent No.: US 11,117,321 B2
(45) Date of Patent: Sep. 14, 2021

(54) SELECTIVE LASER SINTERED FUSED DEPOSITION PRINTING WITH COOLING

(71) Applicant: Sciperio, Inc, Orlando, FL (US)

(72) Inventors: Kenneth H. Church, Orlando, FL (US); Paul Deffenbaugh, Orlando, FL (US); Casey Perkowski, Orlando, FL (US); Charles Michael Newton, Grant, FL (US); Samuel LeBlanc, Orlando, FL (US)

(73) Assignee: SCIPERIO, INC, Orlando, FL (US)

( * ) Notice: Subject to any disclaimer, the term of this patent is extended or adjusted under 35 U.S.C. 154(b) by 593 days.

(21) Appl. No.: 15/711,968

(22) Filed: Sep. 21, 2017

(65) Prior Publication Data

US 2018/0079136 A1  Mar. 22, 2018

Related U.S. Application Data

(60) Provisional application No. 62/398,355, filed on Sep. 22, 2016.

(51) Int. Cl.

| | |
|---|---|
| *B29C 64/273* | (2017.01) |
| *B29C 71/02* | (2006.01) |
| *B29C 64/106* | (2017.01) |
| *B29C 37/00* | (2006.01) |
| *B23K 26/0622* | (2014.01) |
| *B23K 26/06* | (2014.01) |
| *B32B 38/00* | (2006.01) |
| *B32B 41/00* | (2006.01) |

(Continued)

(52) U.S. Cl.
CPC ........ *B29C 64/273* (2017.08); *B23K 26/0622* (2015.10); *B23K 26/0626* (2013.01); *B29C 37/0082* (2013.01); *B29C 64/106* (2017.08); *B29C 71/02* (2013.01); *B32B 38/0012* (2013.01); *B32B 41/00* (2013.01); *B29C 2037/90* (2013.01); *B29C 2791/009* (2013.01); *B29C 2948/92542* (2019.02); *B29C 2948/92571* (2019.02); *B29K 2105/251* (2013.01); *B32B 2309/02* (2013.01); *B33Y 10/00* (2014.12)

(58) Field of Classification Search
CPC ........................... B29C 64/273; B29C 64/393
See application file for complete search history.

(56) References Cited

U.S. PATENT DOCUMENTS

| | | |
|---|---|---|
| 5,354,323 A | 10/1994 | Whitebook |
| 5,530,221 A | 6/1996 | Benda et al. |

(Continued)

OTHER PUBLICATIONS

International Search Report and Written Opinion of PCT/US17/52892 (dated Dec. 5, 2017).

*Primary Examiner* — Joseph A Miller, Jr.
(74) *Attorney, Agent, or Firm* — Goodhue, Coleman & Owens, P.C.

(57) ABSTRACT

A method of additive manufacturing of an object may include directing laser energy from a laser to a region for material deposition, extruding material using an extruder at the region of material deposition, sensing temperature within the region of the material deposition, and electronically controlling the laser energy using the temperature so as to sufficiently heat the region for material deposition prior to extruding the material to increase strength of the object. The method may include hardening or freezing extruded material through cooling in real-time.

25 Claims, 14 Drawing Sheets

(51) Int. Cl.
 *B33Y 10/00* (2015.01)
 *B29K 105/00* (2006.01)

(56) References Cited

U.S. PATENT DOCUMENTS

| | | | |
|---|---|---|---|
| 6,397,922 B1* | 6/2002 | Sachs | B22C 9/00 |
| | | | 164/4.1 |
| 2002/0129485 A1* | 9/2002 | Mok | G05B 19/4099 |
| | | | 29/527.2 |
| 2009/0020901 A1* | 1/2009 | Schillen | B29C 70/88 |
| | | | 264/31 |
| 2009/0134540 A1* | 5/2009 | Khoshnevis | B28B 3/20 |
| | | | 264/40.7 |
| 2009/0152771 A1* | 6/2009 | Philippi | B33Y 10/00 |
| | | | 264/410 |
| 2009/0266804 A1* | 10/2009 | Costin | B41M 5/24 |
| | | | 219/121.85 |
| 2010/0148387 A1* | 6/2010 | Komatsu | B29C 45/0001 |
| | | | 264/40.1 |
| 2010/0191360 A1* | 7/2010 | Napadensky | G06T 17/00 |
| | | | 700/98 |
| 2012/0003726 A1 | 1/2012 | Jones et al. | |
| 2013/0193619 A1 | 8/2013 | Church et al. | |
| 2015/0048553 A1* | 2/2015 | Dietrich | B33Y 10/00 |
| | | | 264/401 |
| 2015/0202826 A1* | 7/2015 | Paternoster | B33Y 10/00 |
| | | | 428/474.7 |
| 2015/0283947 A1* | 10/2015 | Bard | B60R 5/04 |
| | | | 414/462 |
| 2015/0367415 A1* | 12/2015 | Buller | B23K 26/346 |
| | | | 419/53 |
| 2016/0031159 A1 | 2/2016 | Church et al. | |
| 2016/0040025 A1* | 2/2016 | Norikane | C09D 103/02 |
| | | | 106/157.2 |
| 2016/0096326 A1* | 4/2016 | Naware | B33Y 30/00 |
| | | | 425/143 |
| 2016/0128433 A1 | 5/2016 | Downing et al. | |
| 2016/0184925 A1 | 6/2016 | Huang et al. | |
| 2016/0236414 A1 | 8/2016 | Reese et al. | |

\* cited by examiner

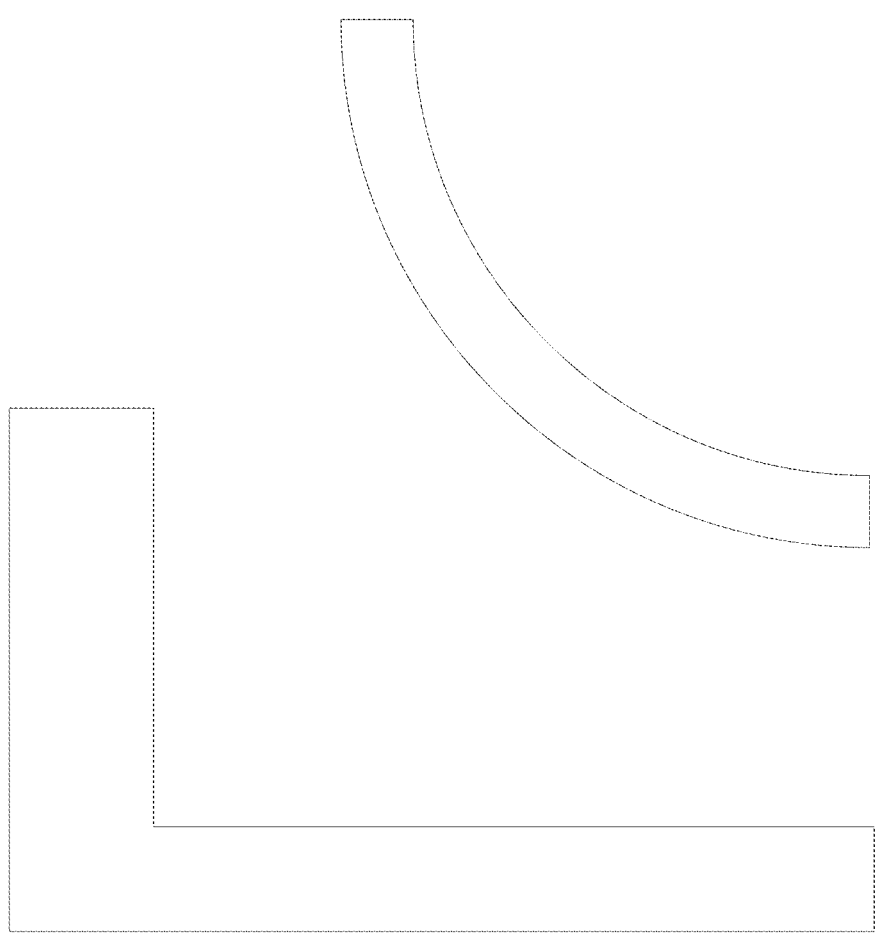
FIG. 14

SELECTIVE LASER SINTERED FUSED DEPOSITION PRINTING WITH COOLING

RELATED APPLICATIONS

This application claims priority to U.S. Provisional Patent Application No. 62/398,355, filed Sep. 22, 2016, and entitled "Selective Laser Sintered Fused Deposition Printing with Cooling", hereby incorporated by reference in its entirety.

FIELD OF THE INVENTION

The present invention relates generally to 3D printing of single or multi-materials using combined selective laser sintering and fused deposition of materials and may include the ability to provide cooling.

BACKGROUND OF THE INVENTION

Selective Laser Sintered (SLS) is typically done using a powder bed and a laser at a set power and spot size which sinters plastic or metal powder. Fused Deposition Printing (FDP) is also known as Fused Filament Fabrication (FFF). FFF has a specific trademark of Fused Deposition Modeling (FDM) and this is common language in the 3D printing world. FFF uses a filament, and while FDP is identical in many ways to FFF, it may not require a filament as the material feed. FDP can use filament, pellets or powder. These three use heated nozzles that melts thermoplastic material and forces it through a small orifice. The first layer of printing is important and if good adhesion is not achieved, the print will curl and the next layer will not adhere. To accommodate this, a heated bed or a glue base is used to capture the first layer. A heated bed helps the second layer adhere to the first layer and this continues to many layers. If the structure is too large, the top layers are much hotter than the cooled layers below and this will cause the object to delaminate.

SLS uses a powder bed and the laser has a given spot size that will provide localized heat that sinters the spot size region. Scanning or patterning is done in two dimensions. Once the pattern is complete a thin layer of thermoplastic has been fused or sintered to make a single piece. The single layer or pattern is lowered and a second layer of powder covers the first layer. The laser patterns again, fusing the localized spots deep enough to fuse to the first layer. This is done as many times as needed to build the object. SLS objects have good strength properties in all dimensions and does not suffer the same delamination issues due to the printed layers.

A further problem which relates to both SLS and FDP involves limitations imposed by the use of layer by layer builds. It would be beneficial to replace layer by layer builds by printing in free space thereby allowing for certain 3D structures to be printed more quickly with less use of resources. For example, to print 3D structures that have an overhang or other certain features, sacrificial materials are used. Once the object is printed, the sacrificial material is removed leaving a strategic void. However, creating 3D structures in this ways requires more time, more materials, and additional resources then if the 3D structures could be created in free spaces.

What is needed are new methods, systems, and apparatus that provide for improving over SLS and FDP processes.

SUMMARY OF THE INVENTION

Therefore, it is a primary object, feature, or advantage to improve over the state of the art.

It is a further object, feature, or advantage to provide a method of additive manufacturing that avoids or overcomes limitations associated with SLS and/or FDP.

It is a further object, feature, or advantage to provide a method of additive manufacturing which allows for 3D structures to be created in free space and without the need for sacrificial layers.

It is a still further object, feature, or advantage to provide for direct digital cooling of material being deposited as a part of an additive manufacturing process.

One or more of these and/or other objects, features, or advantages will become apparent from the specification and claims that follow. No single embodiment need provide each and every object, feature, or advantage as different embodiments may have different objects, features, or advantages.

According to another aspect, a method of additive manufacturing of an object includes directing laser energy from a laser to a region for material deposition, extruding material using an extruder at the region of material deposition, sensing temperature within the region of the material deposition, and electronically controlling the laser energy using the temperature so as to sufficiently heat the region for material deposition prior to extruding the material to increase strength of the object. The method may further include cooling the material immediately after deposition of the material.

According to another aspect, a system for additive manufacturing includes an extruder for extruding a material onto a surface, a laser for directing laser energy onto the surface, a heat detector for sensing temperature at the surface, a cooling unit, and a control system operatively connected to the extruder, the heat detector, the cooling unit, and the laser. The control system is configured to control the directing of the laser energy onto the surface based on the temperature at the surface sensed using the heat detector to heat a region of the surface prior to extruding the material onto the surface and to control the cooling of the material using the cooling unit.

According to another aspect, a method of additive manufacturing of an object is provided. The method includes directing laser or LED energy in a region of material deposition as an ultraviolet (UV) curing light source, and controlling the laser power in a closed loop feedback from temperature sensing in the deposition region. The method may further include actively cooling the region of the material deposition.

According to another aspect, a method of combining Selective Laser Sintering and Fused Deposition Printing in a single process includes extruding material using a Fused Deposition Printing approach, directing laser energy in a region of material deposition, and electronically controlling the laser power in a closed loop feedback from temperature sensing in the deposition region. The method may further include actively cooling the region of the material deposition.

According to another aspect, a method of using a laser to prepare a surface for Fused Deposition Printing includes directing laser energy from a laser to a region of material deposition, with the laser energy being either pulsed or continuous wave, texturing the surface using the laser energy, and extruding material on the surface of the textured area using Fused Deposition Printing or other Direct Print methods. The method may further include actively cooling the region of the material deposition in real-time.

According to another aspect, a method of using a laser to remove and replace defective material as a repair process includes directing laser energy in a region of material for removal, directing laser energy in a region of material deposition (the laser energy being pulsed or continuous wave), and extruding material onto the surface to repair. The method may further include actively cooling the material in real-time.

According to another aspect, a method includes using a laser or a mill to smooth a defective area and then using a laser and temperature feedback to restart or continue a printing process.

According to another aspect, a method of additive manufacturing of an object includes extruding material using an extruder at a region of material deposition and actively cooling the material.

According to yet another aspect, a method of additive manufacturing of an object includes extruding material using an extruder at a region of material deposition and hardening the material in free space using real-time cooling.

BRIEF DESCRIPTION OF THE DRAWINGS

FIG. 14 illustrates a few examples of structures with overhangs.

DETAILED DESCRIPTION OF THE PREFERRED EMBODIMENTS

Figure 1:
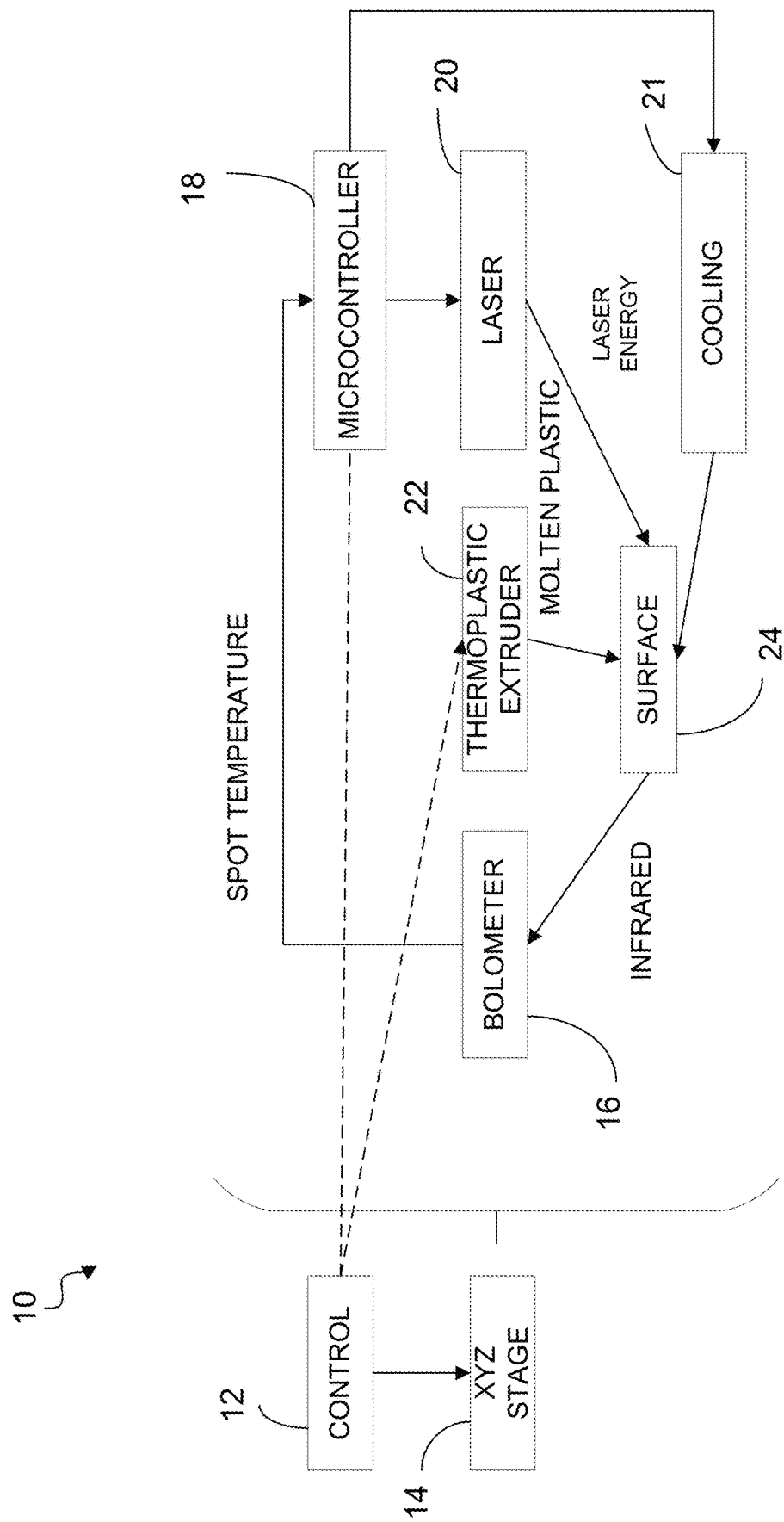
FIG. 1 is a block diagram of the system. The block diagram shows a print head, a laser source, a detection source, an XYZ motion and a controller that integrates these for synchronous motion and control.

Combining SLS and FDP allows solid lines or patterns to be printed using FDP in 2 dimensions. Any place a line is printed and a second line is joined to the first line in 2 dimensions there is still a weak point that can delaminate. Joining these two lines using a laser to melt or weld the seam provides strength. This can be done in real time using a focused temperature feedback reader such as a bolometer and a laser. The temperature can be accurately controlled and this provides perfect melded seams. The second layered pattern which is similar to fusing two lines that are in an XY plane touching each other, but this is two lines in the XZ or YZ plane and still touching each other. The laser is utilized and will lead the print therefore making a thin liquid level for the new material to be printed in. This will unite the layers as a single material and reduce or eliminate the delamination issue.

This approach will eliminate the need to print on heated beds. The laser will heat a plastic or metal surface and this will promote adhesion. For plastic surfaces, the laser will provide a small melt zone and the printed layer will then be melt to melt. For metal layers the mismatch in material types will challenge adhesion. To accommodate this, the laser may be put in pulsed mode and tiny micro-pits will be made in the same pattern as the pattern to be printed. The print will begin and the laser will heat the metal thus allowing the melted thermoplastic to pool in the micro-pits. When this cools, a small amount of shrinkage will occur and pull the plastic tight into the pits and adhesion will occur. It is possible with this approach to print on any existing object or to begin a print and stop. Take out the printed object and then put it back for immediate continued printing.

The present invention recognizes the need for enhancing 3D printed objects. The combination of SLS and FDP on a single platform and controlled by one controller for synchronous and consistent results is obtained by strategically placing fibers for the laser and the detection near the pen tip. In some cases the detector cannot be fiber fed and may need to be in proximity to the pen tip. Small micro-lenses may be printed on the fiber ends to provide focusing of the laser. The number of lasers can range from one (1) to a continuous ring of lasers or tens (10s) to hundreds (100s) of fibers. The optimal number will depend on the specific application, but eight (8) allows for a symmetrical number of laser spots that would encircle the pen tip. This allows for the material to be heated from several angles.

The laser being coupled into the fiber may be a range of lasers, but a diode laser is efficient, compact, rugged and cost effective. The diode may be coupled into the laser at a distance set by the length of the fiber optic cables. These are very low loss, so meters are essentially lossless. Depending on the power requirement this may be one (1) laser per fiber or one (1) laser and a galvo that moves the laser to a chosen fiber.

The heat detector may be a non-contact detector and a common detector for this is a bolometer although other types of heat detectors may be used. A bolometer may provide a good resolution that matches the size of the prints and the laser spots coming from the fiber optic cable. The bolometer provides fast thermal readings. These readings are put in a closed loop feedback system that controls the laser power output. The laser power output can range from milliwatts to tens (10s) or hundreds (100s) of watts of power and this is near instantaneous. This changes the temperature on the spot in near instantons times matching the feedback for controlling the temperature of the spot.

The spot size may range from single digit microns to millimeters. In some cases it may be necessary to make the spot size tens (10s) or even hundreds (100s) of millimeters. The spot size may match or nearly match the size of the print from the pen tip. The laser may heat a localized area instantaneously to allow the newly printed material that is extruded from the pen tip to match temperatures. The extruded material from the pen tip may range from room temperature to hundreds (100s) of degrees Celsius. The temperature requirement depends on the material being extruded through the pen tip. Any number of different materials may be used. The material being extruded may reach a melt temperature and reach a liquid state or near liquid state. The material exits the hot pen tip and quickly cools, since the volume of the liquid is small as compared to the surface area. This is a localized process and the laser is also a localized process. The localized process will traverse in a specified direction at a specified speed. The direction can be any direction in an XYZ coordinate system. The speed can vary from very slow, such as less than one (1) mm per second to more than one (1) meter per second. Typical speeds are in the range of tens (10s) to hundreds (100s) of millimeters per second. The laser may heat at linear speeds that match the print speeds. This creates a match of localized temperature of a substrate or of one layer to the next layer and therefore fusing more completely the layers.

FIG. 1 illustrates one example of a system 10. A control system 12 is shown which may be used to control an XYZ stage or other stage. The control system 12 is operatively connected to a microcontroller 18 or other intelligent control and a thermoplastic extruder 22. The thermoplastic extruder 22 provides for extruding or printing molten plastic onto a surface 24. The microcontroller 18 receives temperature information from a heat detector such as a thermal imaging detector or bolometer 16. The microcontroller then controls a laser 20 to emit laser energy to the surface 24. The laser may use a laser diode or other type of laser. The laser energy may be pulsed or may be continuous.

In operation, the heat detector such as bolometer 16 may measure infrared, or heat radiation including a spot temperature on the surface 24. The temperature data may then be communicated to the microcontroller 18. The microcontroller 18 may then control the laser 20 based on the temperature data so as to stop heating the surface 24 or to continue heating the surface 24 with laser energy. This heating is performed on a region of the surface prior to extruding molten plastic by the thermoplastic extruder 22 in order to prepare the surface.

The microcontroller 18 may also provide for controlling the cooling of the molten plastic. The cooling 21 may be performed in various ways. For example, the cooling may be performed by directing cooled air at or towards the molten plastic. The cooled air may be directed through a cooling tube with the microcontroller 18 controlling a valve or actuator associated with the cooling tube to control release of the cooled air. Other forms of cooled fluids may be used including liquid nitrogen. Other forms of cooling are also contemplated.

The cooling may be performed in real-time. Thus, the printing may be performed in free space. The printing may be performed using a hard thermoplastic or other material which is fed through the heated nozzle, melting it. Once melted, it flows and then it hardens (freezes) and holds its shape due to the cooling provided.

Figure 2:
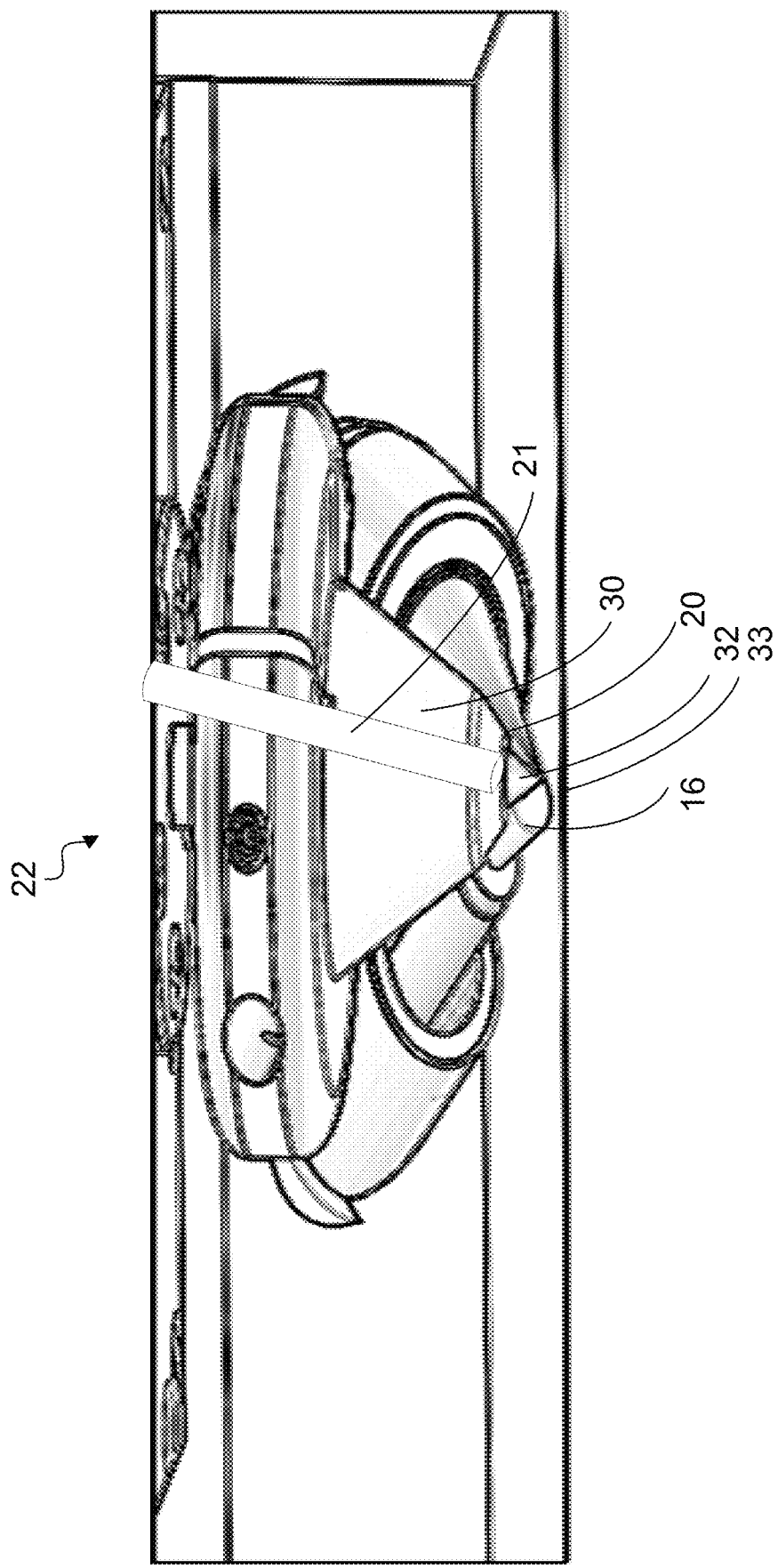
FIG. 2 is a diagram of the printer with the laser and thermal detector pointing at a common point on an XYZ stage.

It is to be understood that although both laser heating and cooling are shown in FIG. 1, in some applications there may be laser heating but not cooling. In other applications there may be cooling but not laser heating. FIG. 2 illustrates one example of portions of the thermoplastic extruder 22 of a 3D printer. A nozzle 30 is shown with a tip 32. Both a laser 16 and a thermal detector 20 point at a common point on an XYZ stage 33. A cooling tube 21 is also shown which may be used to direct a stream of cooled fluid towards the material which is printed thereby allowing for real-time cooling. Real-time cooling enables printing in free space as printed materials may be quickly hardened thereby allowing the materials to hold their shape without drooping, sagging, falling, or otherwise comprising structural integrity.

Figure 3:
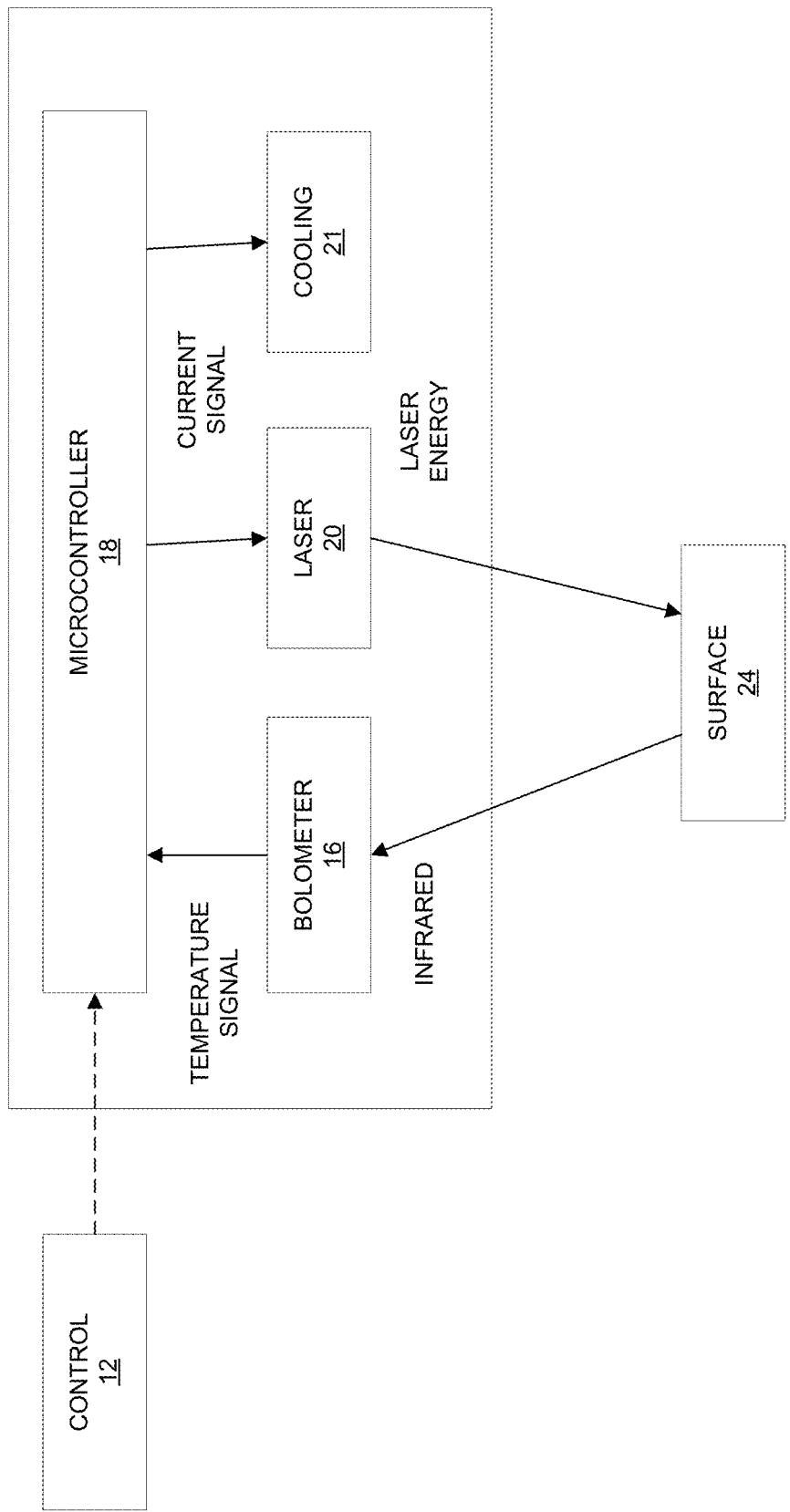
FIG. 3 is a diagram of a system.

FIG. 3 illustrates another diagram of a system. As shown in FIG. 3, a control 12 is operatively connected to a microcontroller 18. The microcontroller 18 may provide a current signal to control a laser 20. The laser 20 emits laser energy to a surface 24 to heat the surface. A heat detector such as a thermal imaging detector or bolometer 16 may be used to determine surface temperature of the surface 24. A cooling unit or cooling source 21 may be used to provide for cooling. The cooling unit 21 may include a tube extending therefrom which directs cooled fluid such as cooled air towards the material to be cooled.

Figure 4:
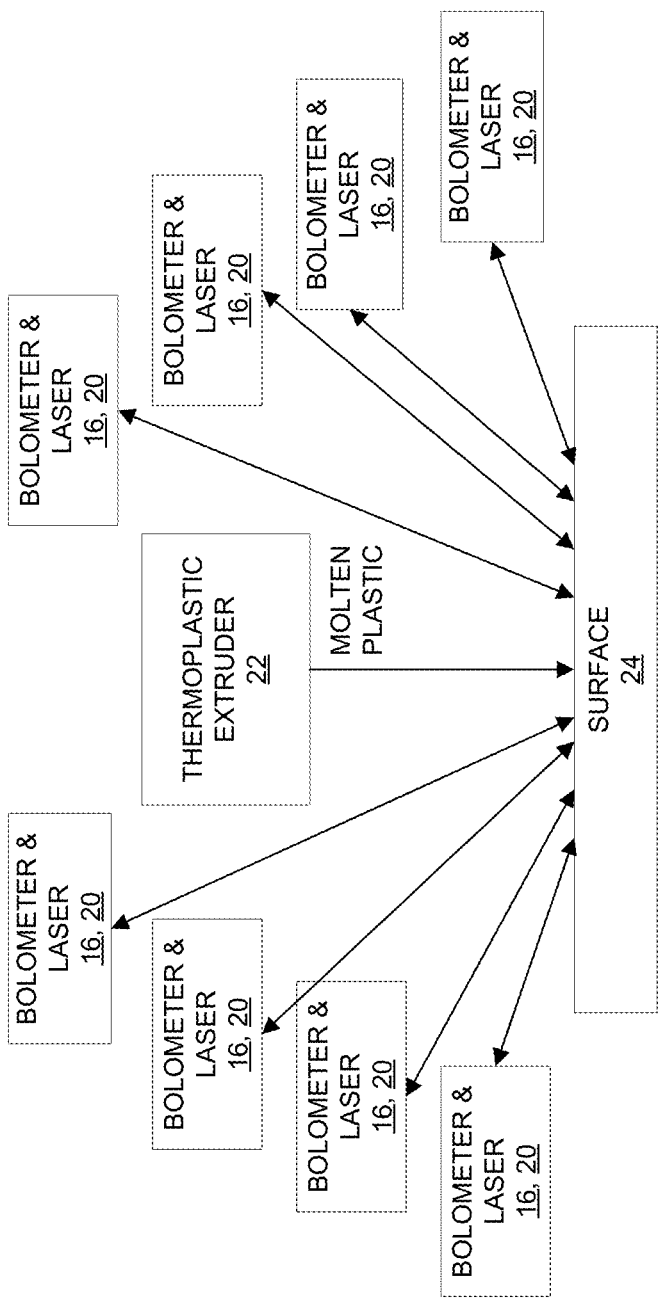
FIG. 4 is a diagram of a system including a ring of fibers which includes both laser emitters and light detection for heat sensing.

FIG. 4 illustrates another example where there are a plurality of heat detectors or thermal imaging detectors or bolometers 16 and a plurality lasers 20 which may be configured in a ring around the thermoplastic extruder 22.

Figure 5:
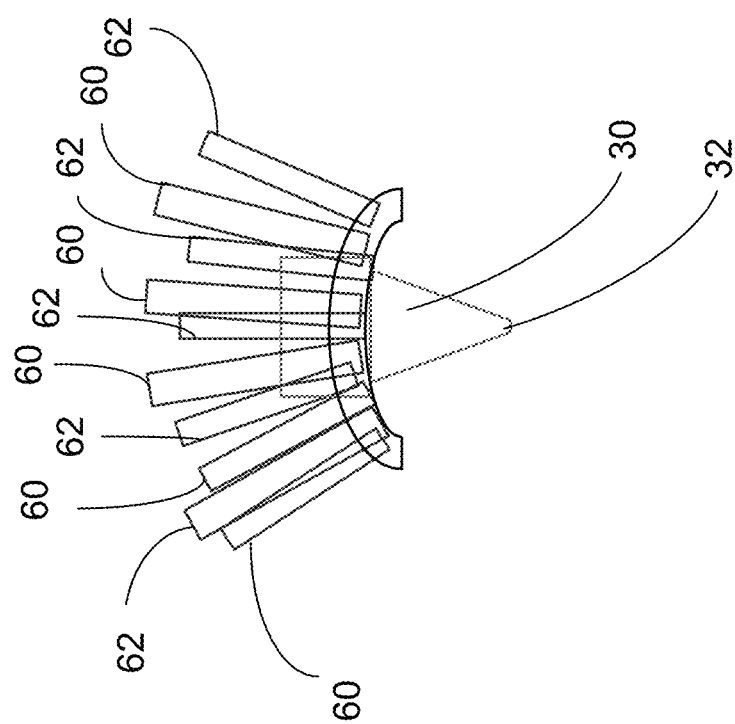
FIG. 5 is a diagram showing a ring of fibers which may be positioned around a pen tip.

FIG. 5 is another view where there is a ring of bolometers and lasers configured in a ring around a nozzle 30 having a tip 32. As shown in FIG. 5, fibers 60 for the laser and fibers 62 for the heat detector(s) may be used.

Figure 6:
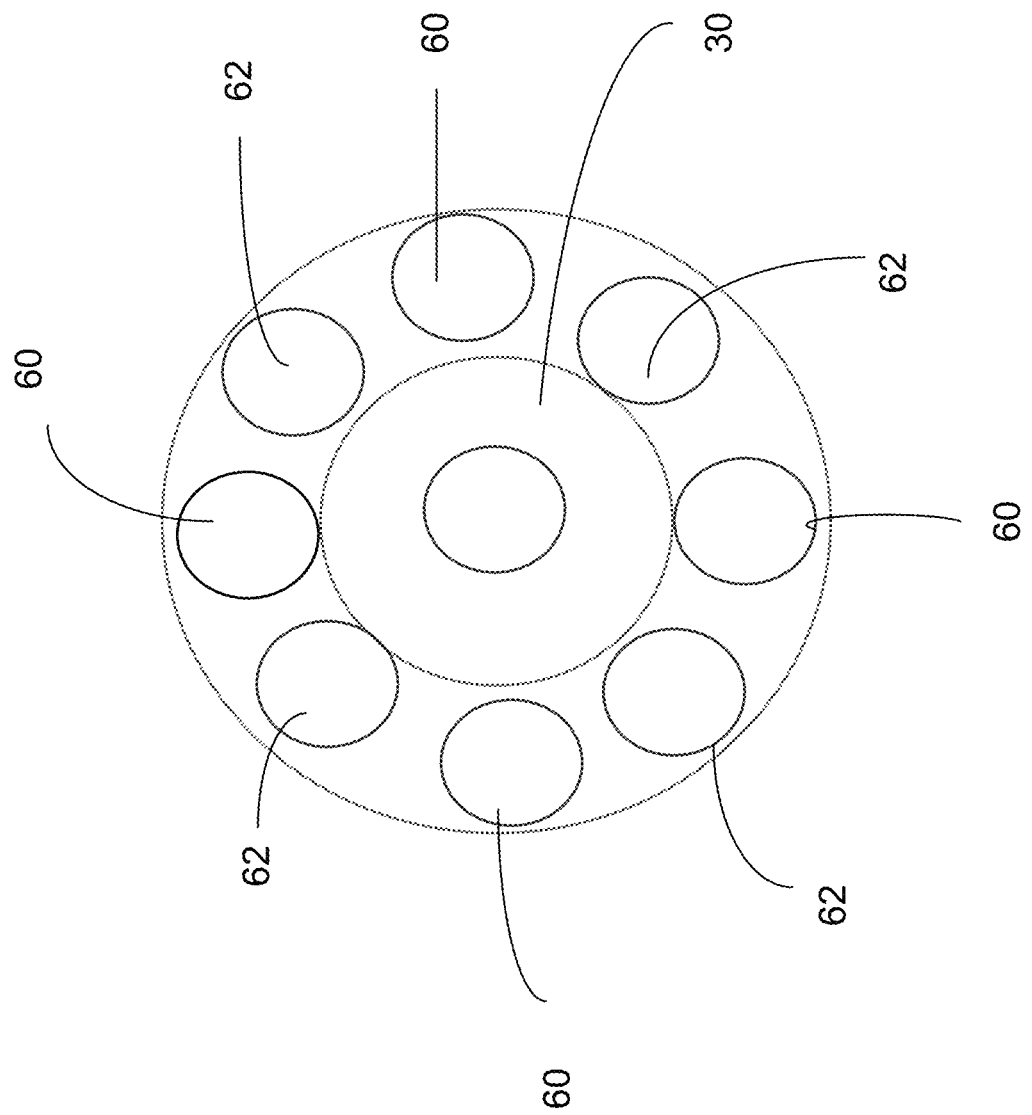
FIG. 6 is another diagram showing a ring of fibers around a pen tip of a nozzle.

FIG. 6 is another view of a ring of fibers with detectors 60 such as bolometers and fibers with lasers 62 configured in a ring around a nozzle 30.

Figure 7:
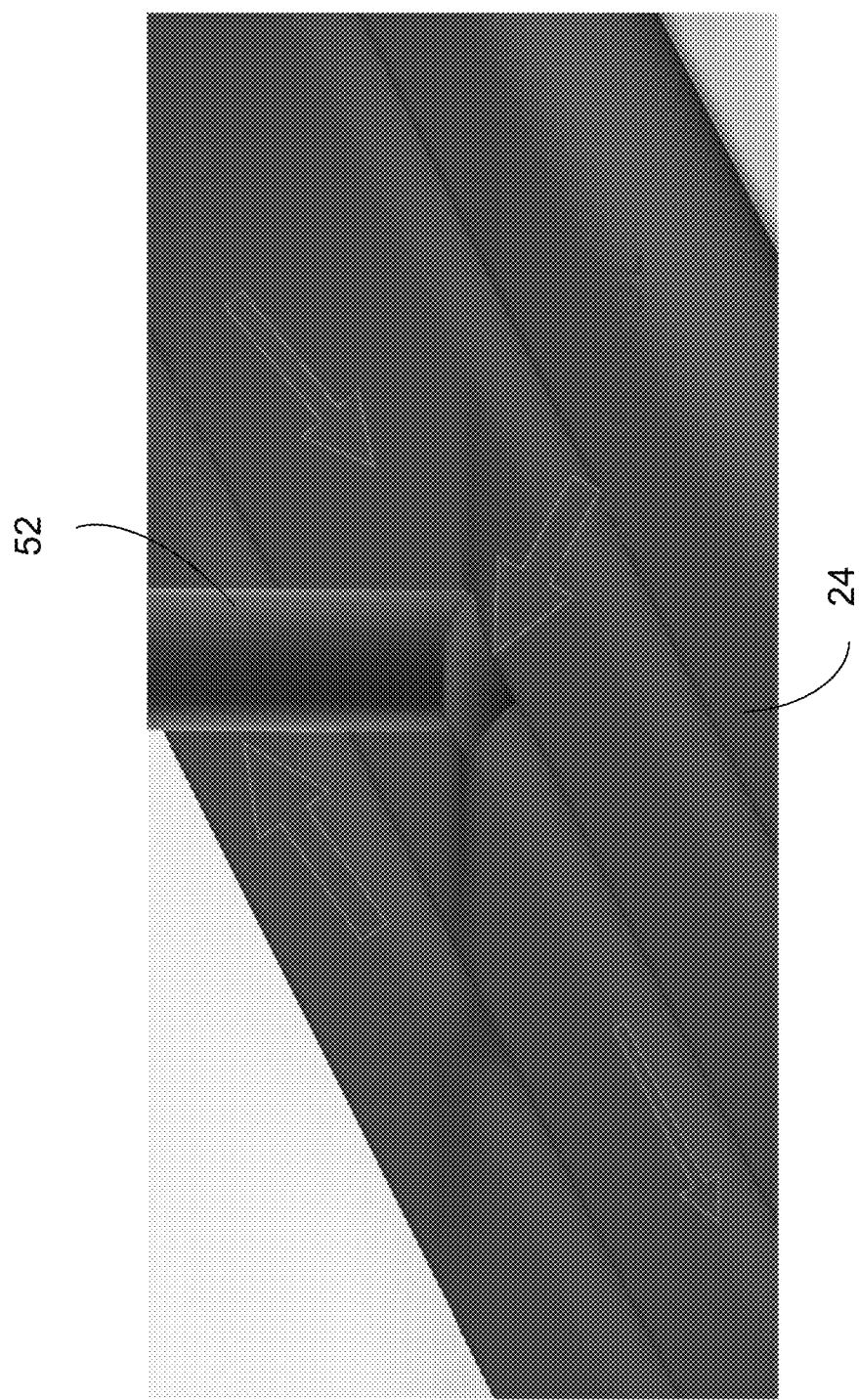
FIG. 7 is a diagram of two layers being fused together in XY plane.

FIG. 7 illustrates interaction between a laser beam 52 and a surface 24. The laser beam 52 heats the surface 24 to form a melt pool which allows for a welded seam to be formed. The two layers are then fused together in the XY plane. To assist in this fusing a stream of cooled fluid (or multiple streams of a cooled fluid) may be directed towards the site to allow for freezing in real-time.

In addition to its use in welding seams, the laser beam 52 provides other uses. For example, a control system may determine that a region of material deposition has a defective area. Thus, instead of continuing with the build process, the laser may return to the region which has the defective area and the defective area may be reheated with the laser to provide for smoothing of the defective area. Alternatively, the defective area may be milled or otherwise processed. Thus, deposited material may be removed.

Figure 8:
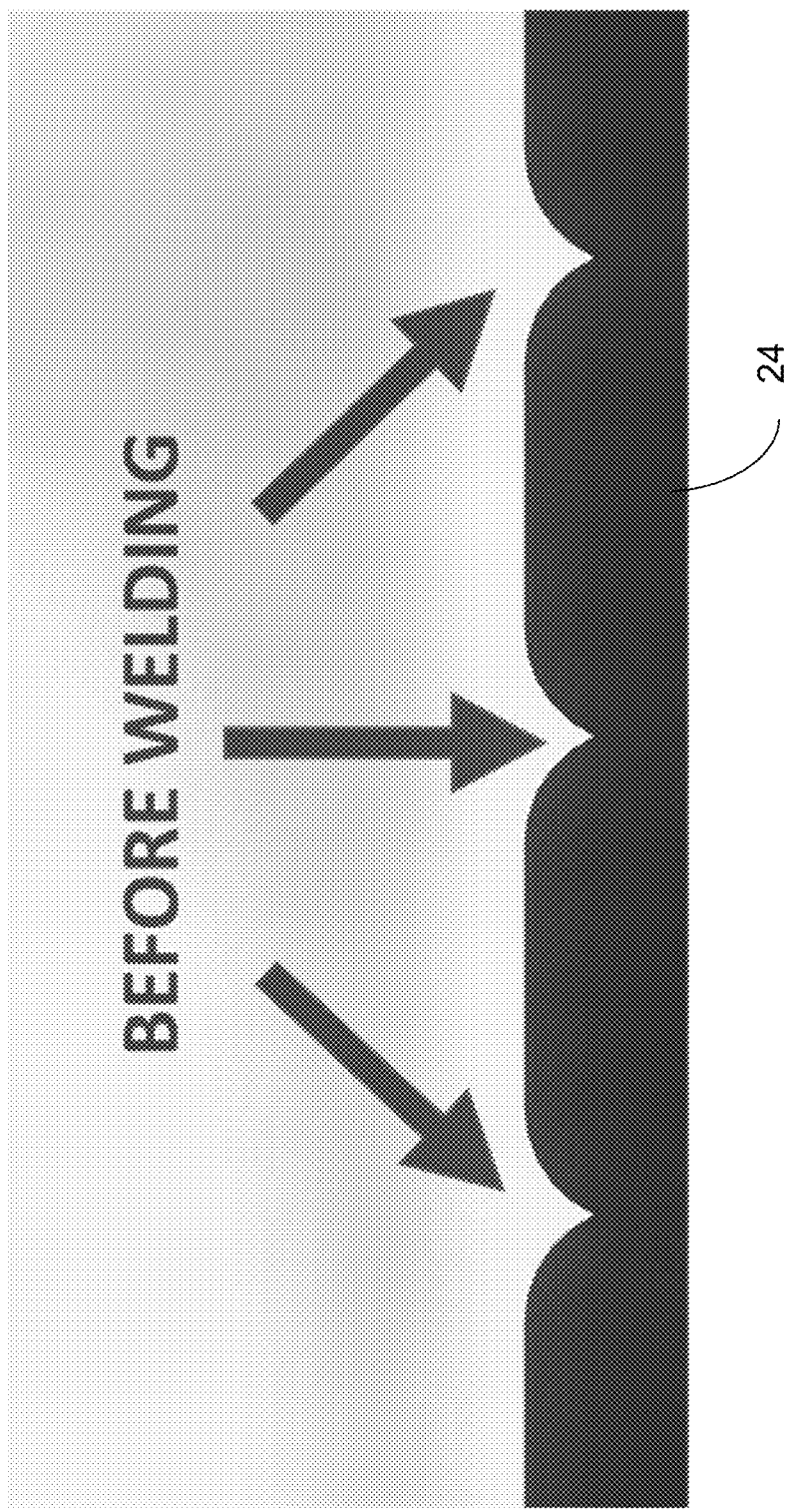
FIG. 8 is a diagram of multiple layers prior to being fused together in the YZ plane.
Figure 9:
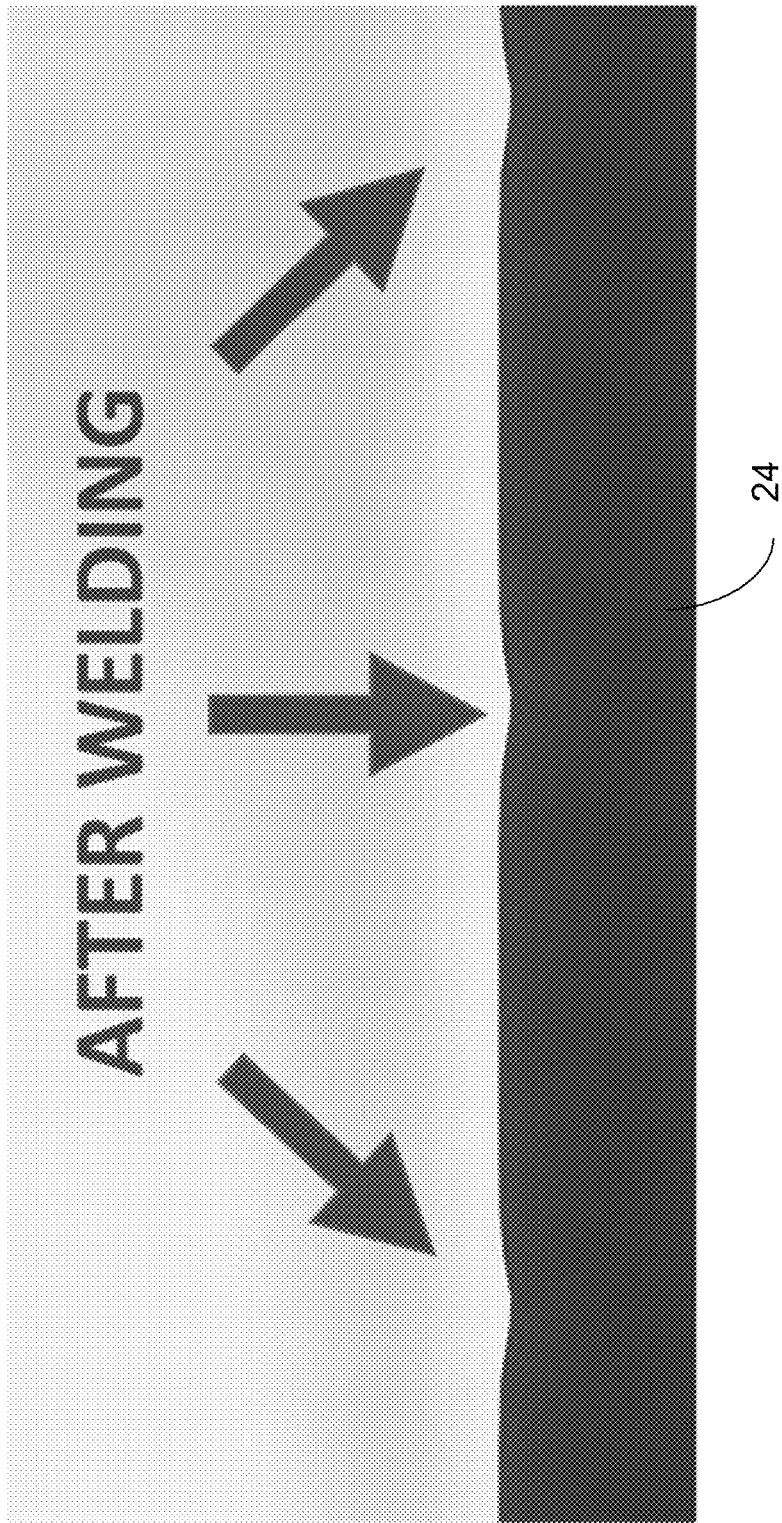
FIG. 9 is a diagram of multiple layers after being fused together in the YZ plane.

FIG. 8 illustrates a surface 24 before welding where seams are present and in the YZ plane. FIG. 9 illustrates the surface 24 after welding where the seams have been welded and in the YZ plane. The method described allows for the strength of the object being 3D printed to be increased by reducing susceptibility of delamination of layers of the object due to the improved adhesion.

Figure 10:
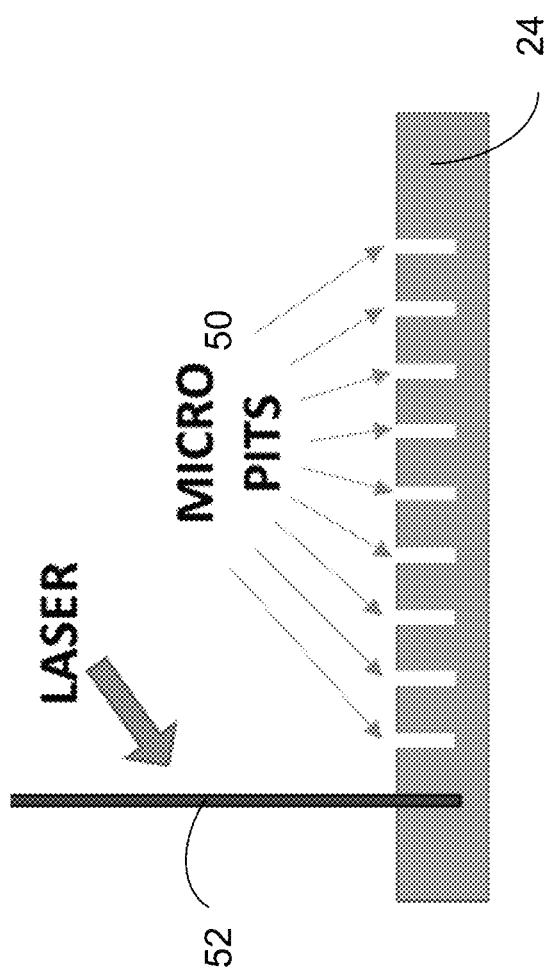
FIG. 10 is a diagram of a surface being pitted.

FIG. 10 illustrates a surface 24 where a laser beam 52 has made a plurality of micro pits 50 in the surface 24 to produce a pitted surface.

Figure 11:
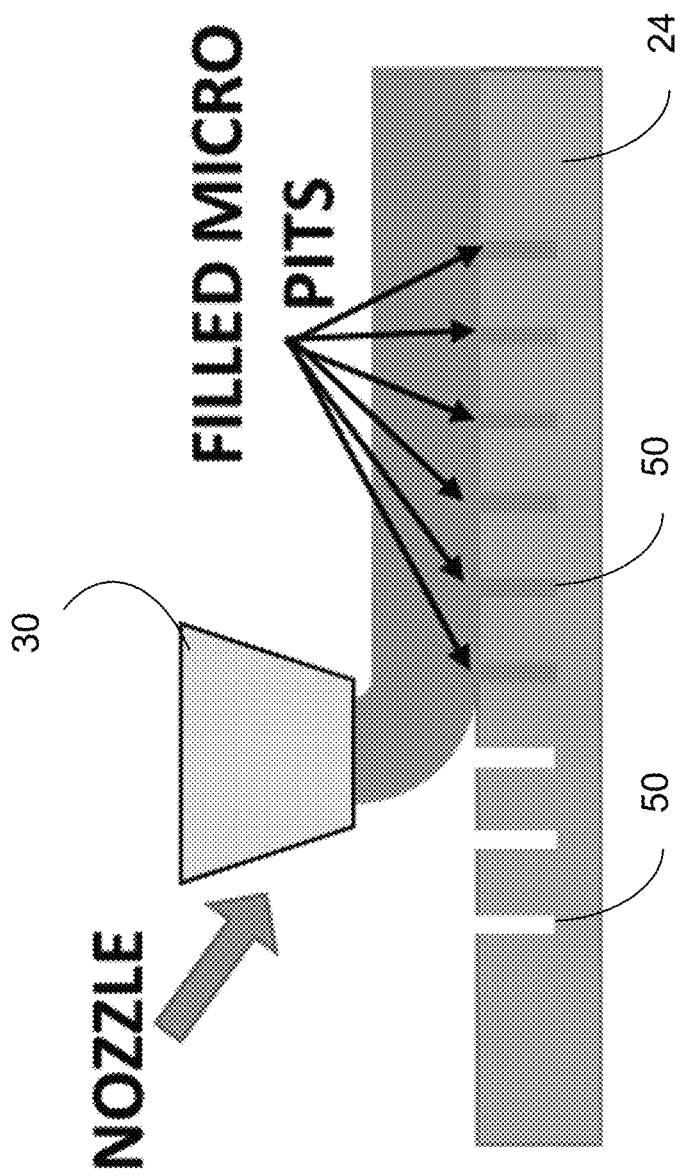
FIG. 11 is a diagram of the surface being printed on after the pitting to promote better adhesion.

FIG. 11 illustrates the surface 50 where material from a nozzle 30 is dispensed or written or otherwise extruded on the surface 24 and fills in micro pits 50 as it is extruded. This pitting of the surface with the laser followed by the printing assists in promoting adhesion between the layer being printed and the previous layers. It should be appreciated that the laser may be used to texture the surface or otherwise prepare the surface in any number of ways to assist in promoting adhesion.

Figure 12:
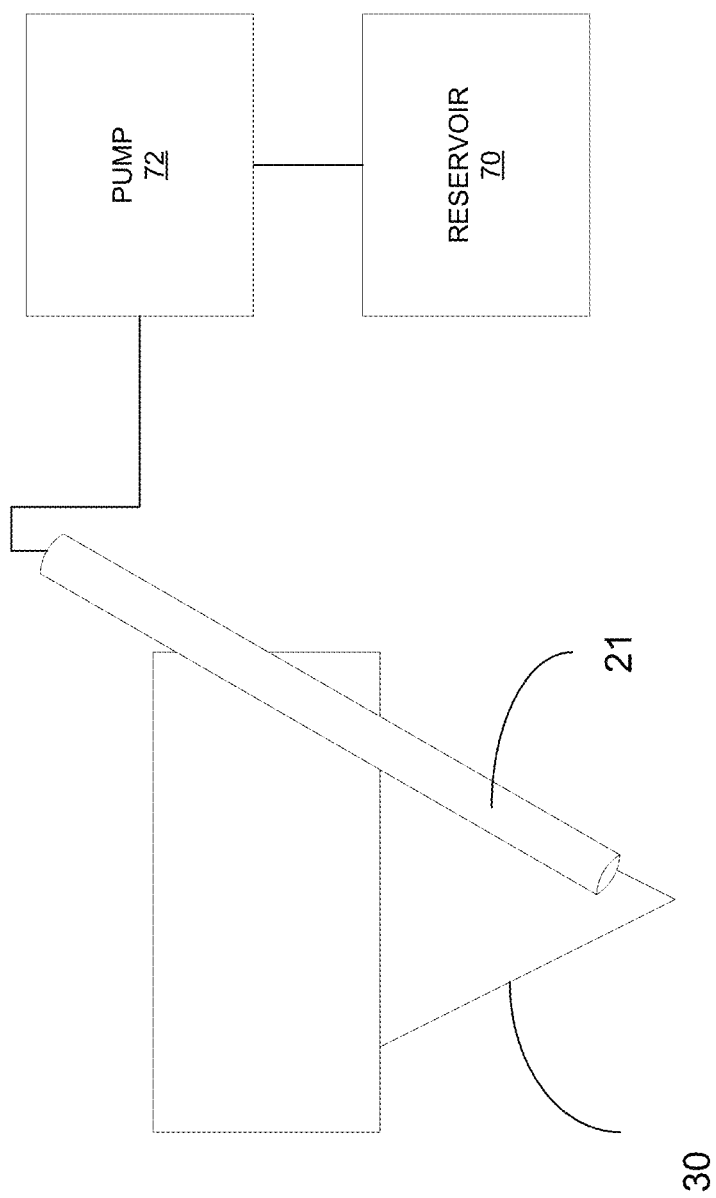
FIG. 12 is a diagram illustrating a cooling unit or cooling system used to cool deposited material.

FIG. 12 illustrates one example of a cooling unit or cooling system. A reservoir 70 is shown which may include a cooling fluid. A pump 72 is used to pump the cooling fluid to the nozzle. A valve associated with the pump or the cooling tube 21 may be used to precisely control the release of the cooling fluid. Alternatively, or in addition, control of the relative position of the opening of the tube to the area to be cooled may be controlled such as by moving the nozzle position when the cooling tube 21 moves with the nozzle, or independently moving the cooling tube 21 if the cooling tube 21 moves independently from the nozzle.

Figure 13:
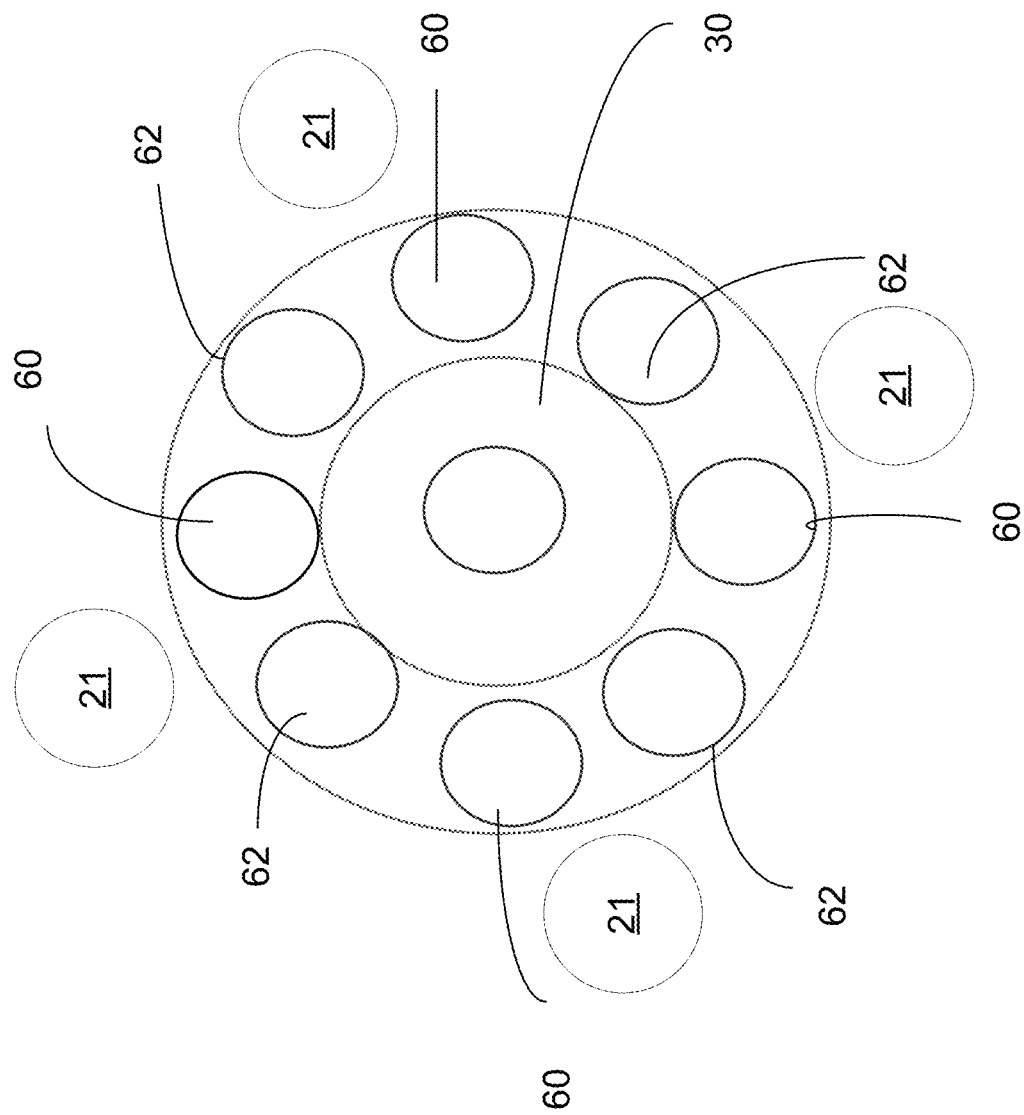
FIG. 13 is a diagram showing a ring of fibers around a pen tip of a nozzle and a plurality of cooling tubes.

It is to also be understood that more than one cooling tube may be present. For example, as shown in FIG. 13, multiple cooling tubes 21 may be present which are located around a ring of fibers with detectors 60 such as bolometers and fibers with lasers 62 configured in a ring around a nozzle 30. More or fewer cooling tubes may be used. It is also to be understood that factors related to cooling may be controlled at least in part based on surface temperature measurements. These factors may include the number of cooling tubes activated (where more than one is present), the pressure used for the fluid, the distance of the cooling tube to the area to be cooled, the temperature of the area to be cooled, the freezing temperature of the material being cooled, or other factors as may be appropriate in a particular application or environment.

FIG. 14 illustrates a few examples of structures with overhangs. Using the methods and systems described herein, these and numerous other structures may be 3D printed without the use of sacrificial layers. Instead, the structures may be created in free space by depositing materials and hardening the material in real-time to avoid drooping or sagging. This is highly advantageous because the printing process may be faster with less use of resources and without the added steps of using the sacrificial material and removing the sacrificial material. It should also be apparent that one of the reasons the process may be performed more quickly is that because the structure is created in free space, it need not be created with the same type of layer-by-layer constraints. For example, the dispenser may move back and forth between layers (e.g. movement in the +/−z direction) in some builds if that is more efficient and if other variables allow.

Therefore, various methods, systems, and apparatus have been shown and described for additive manufacturing. Although specific embodiments have been provided herein, the present invention contemplates numerous additions, variations, options, and alternatives.

What is claimed is:

1. A method of additive manufacturing of an object comprising:
    extruding material using an extruder to form a layer of the object on a previously extruded layer of the material;
    directing laser energy from a laser to a region for material deposition, the region for material deposition being located on the previously extruded layer of the material;
    further extruding additional material using the extruder at the region of material deposition;
    sensing temperature at a surface of the material within the region of the material deposition;
    electronically controlling the directing of the laser energy onto the region for material deposition using the temperature so as to sufficiently heat the region for material deposition prior to extruding the material; and
    actively cooling the additional material.

2. The method of claim 1 wherein the laser comprises a laser diode.

3. The method of claim 1 wherein the laser energy is pulsed laser energy.

4. The method of claim 1 wherein the laser energy is continuous wave laser energy.

5. The method of claim 1 wherein the laser energy textures the region for material deposition.

6. The method of claim 1 further comprising removing deposited material at the region for material deposition using the laser energy from the laser.

7. The method of claim 1 wherein the sensing the temperature is performed using a bolometer.

8. The method of claim 6 wherein the sensing the temperature is performed using a bolometer.

9. The method of claim 1 wherein the sensing the temperature is performed using thermal imaging detector.

10. The method of claim 1 wherein the sensing the temperature is performed using a detector comprising at least one fiber.

11. The method of claim 1 wherein the laser is positionable within free space.

12. The method of claim 1 wherein the laser energy is conveyed from the laser through a fiber delivery system.

13. The method of claim 1 wherein a plurality of fibers are used in sensing the temperature and directing the laser energy.

14. The method of claim 13 wherein the plurality of fibers are arranged in a ring configuration around a pen tip of the extruder.

15. The method of claim 6 wherein the laser energy textures a surface of the region of material deposition in order to prepare the surface.

16. The method of claim 1 further comprising identifying, through a control system, the region of material deposition as a defective area.

17. The method of claim 16 wherein the directing the laser energy from the laser to the region for material deposition provides for smoothing the defective area.

18. The method of claim 16 further comprising milling the defective area.

19. The method of claim 1 wherein the active cooling is performed using a cooled fluid released from a cooling tube.

20. The method of claim 19 wherein the cooled fluid comprises air.

21. The method of claim 19 wherein the cooled fluid comprises liquid nitrogen.

22. A system for additive manufacturing of an object, comprising:
    an extruder for extruding a material onto a surface of a previously extruded layer of the material in order to build the object layer by layer;
    a laser for directing laser energy onto the surface of the previously extruded layer of the material;
    a heat detector for sensing temperature at the surface;
    a cooling unit;
    a control system operatively connected to the extruder, the heat detector, the cooling unit and the laser;
    wherein the control system is configured to control the directing of the laser energy onto the surface of the previously extruded layer of the material based on the temperature at the surface sensed using the heat detector to heat a region of the surface prior to extruding the material onto the surface and to control the cooling of the material using the cooling unit.

23. The system of claim 22 wherein the cooling unit comprises a cooling tube.

24. A method of additive manufacturing of an object comprising:
    directing laser energy from a laser to a region for material deposition;
    extruding material using an extruder at the region of material deposition;
    sensing temperature within the region of the material deposition, wherein a plurality of fibers are used in sensing the temperature and directing the laser energy, wherein the plurality of fibers are arranged in a ring configuration around a pen tip of the extruder;
    electronically controlling the laser energy using the temperature to sufficiently heat the region for material deposition prior to extruding the material; and
    actively cooling the material.

25. A method of additive manufacturing of an object comprising:
- extruding material using an extruder to form a layer of the object;
- directing laser energy from a laser to a region for material deposition, the region for material deposition being located on the layer of the object;
- further extruding additional material using the extruder at the region of material deposition;
- sensing temperature within the region of the material deposition;
- electronically controlling the laser energy using the temperature so as to sufficiently heat the region for material deposition prior to extruding the material; and
- actively cooling the additional material;
- identifying, through a control system, the region of material deposition as a defective area; and
- milling the defective area.

* * * * *